Nov. 14, 1950   F. T. HARRINGTON   2,530,241
POWER TRANSMISSION FOR REFRIGERATED MOTOR VEHICLES
Filed Nov. 15, 1945
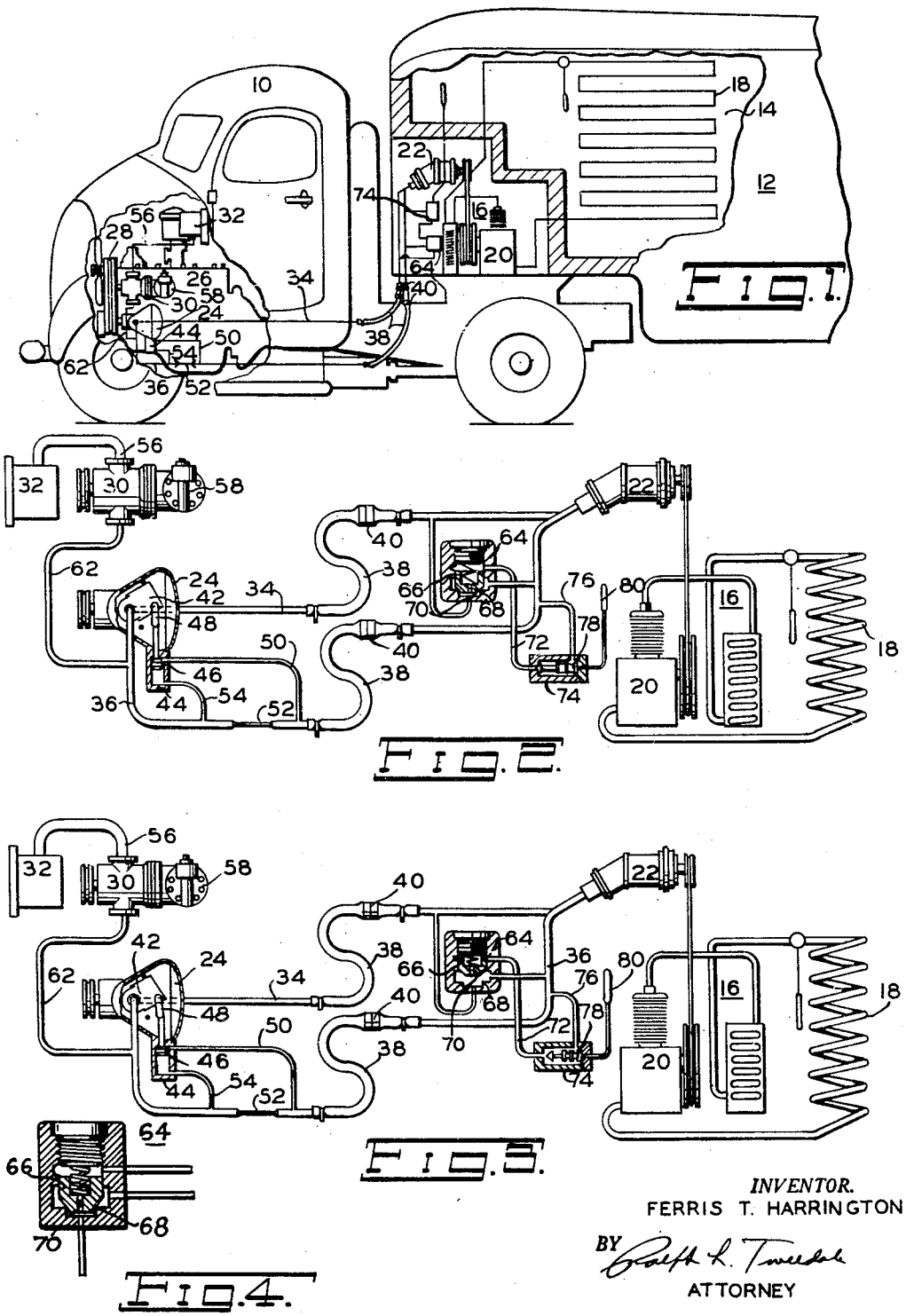
INVENTOR.
FERRIS T. HARRINGTON
BY
ATTORNEY Patented Nov. 14, 1950

2,530,241

UNITED STATES PATENT OFFICE 2,530,241

POWER TRANSMISSION FOR REFRIGERATED MOTOR VEHICLES

Ferris T. Harrington, Detroit, Mich., assignor to Vickers Incorporated, Detroit, Mich., a corporation of Michigan Application November 15, 1945, Serial No. 628,821

5 Claims. (Cl. 62—117)

1

This invention relates to power transmissions, particularly to those of the type comprising two or more fluid pressure energy translating devices, one of which may function as a pump and another as a fluid motor.

The invention is more particularly concerned with a power transmission system particularly adapted for driving a load device requiring substantially constant speed drive from a prime mover which operates at varying speed. For example, in a refrigerated motor vehicle the refrigerator compressor is most efficient when operated at a substantially constant speed and control of refrigeration output is obtained by stopping the compressor automatically when the refrigerated compartment has been reduced to the proper temperature, or when the suction pressure at the compressor has been reduced to the proper degree. The vehicle engine, however, is not operated at constant speed but its speed varies widely under different road conditions.

It is an object of the present invention to provide an improved hydraulic power transmission and control system particularly adapted for vehicle refrigerator drive which will maintain a substantially constant output speed when driven at any input speed over a wide range.

It is a further object of the invention to provide a power transmission system having a variable displacement pump including a displacement regulating fluid motor which is normally effective to maintain a constant speed at the transmission output and which may be also utilized for stopping the transmission effectively and reliably without complicated additional control mechanism.

It is also the object of the present invention to provide a power transmission system particularly adapted for driving a refrigerator compressor from a motor vehicle engine. More specifically, it is an object to provide such a power transmission system wherein the input section of the power transmission is located adjacent to the engine of a multi-section vehicle and the output section thereof is located on another section of the vehicle having a load space to be refrigerated, and in which transmission of power and control thereof in accordance with the refrigeration demand may be effected thru the medium of but a single pair of fluid conduits extending between the two sections of the vehicle.

Further objects and advantages of the present invention will be apparent from the following description, reference being had to the accompanying drawing wherein a preferred form of the present invention is clearly shown.

2

In the drawing:

Figure 1 is a fragmentary side view, partly broken away, of a multi-section vehicle incorporating a preferred form of the present invention.

Figure 2 is a diagrammatic view showing the hydraulic power transmission and refrigeration circuit of Figure 1 showing the parts in the positions occupied when the refrigerator compressor is being driven at a constant speed by the vehicle engine operating at a minimum speed.

Figure 3 is a view corresponding to Figure 2 showing the parts in the position occupied when the refrigerator compressor is at rest.

Figure 4 is an enlarged sectional view of a pilot operated bypass valve.

Referring now to Figure 1, there is shown a vehicle comprising a truck tractor 10 and a semi-trailer 12 having a refrigerated space 14 adapted to be cooled by a condensing unit 16 and an evaporator 18, both of conventional form. The compressor 20 of the condensing unit 16 is adapted to be belt driven by a fluid motor 22. Fluid for driving the motor 22 is supplied by a pump 24 which may be adjacent to and driven by the engine 26 of the tractor section 10; thus the pump 24 may be driven from the usual fan belt 28 which also drives an auxiliary replenishing pump 30. There is also mounted, within the engine compartment, an oil reservoir 32.

Referring now to Figure 2, the pump 24 illustrated is of the reversible variable displacement type and has a delivery port located at its bottom to which is connected a conduit 34 leading to the inlet of the motor 22. From the outlet of the motor 22 a conduit 36 extends to the inlet port of pump 24. Suitable flexible sections 38 and separable couplings 40 are provided in the lines 34 and 36 where they extend between the tractor unit 10 and the trailer unit 12. The pump 24 has a yoke 42 pivotally mounted therein and the position of which determines the direction and amount of displacement of the pump. When the yoke 42 is in its upper position, as illustrated in Figure 2, the pump displacement is at maximum in the forward direction. When it is moved downwardly to horizontal position its displacement is zero.

For the purpose of controlling the position of yoke 42, there is provided a fluid motor comprising a cylinder 44 and piston 46. The latter has its stem connected to the yoke 42 by a link 48. The upper end of cylinder 44 is connected by a conduit 50 with the conduit 36 at a point to the right of a restrictor portion 52 mounted in the conduit 36. The lower end of cylinder 44 is connected by a conduit 54 to the conduit 36 to the left of the restrictor 52. The replenishing pump 30 has a suction conduit 56 leading from the reservoir 32 and is provided with a self-contained relief valve 58. Pump 30 delivers leakage make-up oil thru a conduit 62 connected to the conduit 36 adjacent to the inlet of pump 24, and maintains a low predetermined pressure in the conduit 36 determined by the setting of relief valve 58.

For the purpose of controlling operation of the compressor 20 intermittently in accordance with refrigeration demand, means are provided for stopping the operation of fluid motor 22 whenever required. For this purpose a bypass valve 64 is connected between the lines 34 and 36 so as to open to free flow from line 34 to 36. Means are provided for holding the bypass valve closed, however, during normal operation of the transmission. Thus, the bypass valve piston 66 slides in a bore of larger diameter than the seat 68 and is provided with a restricted passage 70 thru which oil, under pressure, from line 34 is admitted to the top side of piston 66, thus holding the latter on its seat.

The chamber above piston 66 is adapted to be vented whenever it is desired to permit bypass valve 64 to open and for this purpose a conduit 72 extends to a pilot valve 74 which, when open, connects conduit 72 to the conduit 36 by a branch conduit 76. Valve 74 is under the control of a thermostatic element 78 having its temperature responsive bulb 80 located in the refrigerated space 14 and arranged so that valve 74 closes upon a predetermined rise in the temperature in compartment 14 and opens upon a predetermined fall therein.

In operation with the vehicle engine 26 running and a demand for refrigeration the condition of the parts is illustrated in Figure 2. With the engine 26 running at a minimum speed it will be seen that the pump 24 is in its maximum forward displacement position resulting in a predetermined rate of delivery thru conduit 34 to fluid motor 22. This rate of delivery is maintained by the action of restrictor 52 on piston 46 of the pump displacement regulator. Should the speed of the engine 26 increase there will be a tendency for pump 24 to deliver fluid at a higher rate and this will cause a greater pressure drop thru restrictor 52. This results in an increased pressure in conduit 50 relative to that in conduit 54 causing piston 46 to move downwardly decreasing the displacement of pump 24 and restoring the rate of delivery to its former value.

Conversely when the engine is operating at any speed above its minimum, a fall in engine speed will result in a temporary decrease in the rate of delivery, thus reducing the pressure drop thru restrictor 52 and tending to increase the pressure in conduit 54 relative to that in conduit 50, thus moving piston 46 upwardly to increase the displacement of pump 24 and thus maintain the regulated delivery rate. In this way the speed of fluid motor 22 is maintained substantially constant independently of engine speed variation so long as there is a refrigeration demand.

When the temperature in compartment 14 falls to the predetermined setting of temperature element 78 valve 74 will open to the point where it passes oil in sufficient quantity to produce a pressure drop thru restrictor 70 of bypass valve 64 which is sufficient to permit the bypass valve piston 66 to lift against the reduced pressure on top of piston 66. When this occurs the pump delivery is by-passed from conduit 34 to conduit 36 thru bypass valve 64, and fluid motor 22, thereafter, ceases to operate. The piston 46 will continue to regulate the delivery of pump 24 in the manner previously described although it will have no effect on fluid motor 22. As soon as the compartment 14 is warmed up to a predetermined temperature valve 74 will again close thus permitting pressure to build up on the upper side of piston 66 closing bypass valve 64 and restoring the motor 22 to operation.

It will thus be seen that there has been provided a power transmission system particularly adapted for driving a refrigerator compressor from a vehicle engine in a multi-section vehicle. It will be noted that complete control of compressor speed is maintained independently of engine speed variation and that control of the compressor operation is obtained in accordance with refrigeration demand. While the embodiment of the invention selected for illustration is a preferred form it will be understood that the invention may be adapted to other applications. Thus, the improved power transmission system may be used for driving other devices than a refrigerator compressor as, for example, an alternator or in fact, any device wherein a substantially constant speed drive is required. Likewise the input end of the transmission may be driven not merely from a vehicle engine but from the axle or propeller shaft thereof, or from any other rotary part which has a non-constant speed.

While the form of embodiment of the invention as herein disclosed constitutes a preferred form, it is to be understood that other forms might be adopted, all coming within the scope of the claims which follow.

What is claimed is as follows:

1. In a multi-sectioned vehicle having a power plant on one section and a load space and refrigerating means therefor on another section, the combination of a positive displacement hydraulic pump on the one section and driven by said power plant, a positive displacement fluid motor on the other section and driving the refrigerating means, control means on the other section responsive to refrigeration demand to control operation of the motor, and two fluid lines connecting the pump and motor in a closed circuit and constituting the sole connection between the pump on the power plant section and the fluid motor and control means on the load section.

2. In a multi-sectioned vehicle having a power plant on one section and a load space and refrigerating means therefor on another section, the combination of a hydraulic pump on the one section and driven by said power plant, means for regulating the pump displacement to maintain a substantially constant delivery therefrom independent of the power plant speed, a fluid motor on the other section and driving the refrigerating means, control means on the other section responsive to refrigeration demand to control operation of the motor, and two fluid lines connecting the pump and motor in a closed circuit and constituting the sole connection between the pump and its regulating means on the power plant section and the fluid motor and control means on the load section.

3. In a multi-sectioned vehicle having a power plant on one section and a load space and refrigerating means therefor on another section, the combination of a hydraulic pump on the one section and driven by said power plant, a fluid motor on the other section and driving the refrigerating means, control means on the other section responsive to refrigeration demand to control operation of the motor, said control means including a bypass valve connected in shunt with the fluid motor, and two fluid lines connecting the pump and motor in a closed circuit and constituting the sole connection between the pump on the power plant section and the fluid motor and control means on the load section.

4. In a multi-sectioned vehicle having a power plant section and a load section and refrigerating means on the load section, a hydraulic power transmission for driving the refrigerating means from the power plant and comprising a pump driven by the power plant, a fluid motor driving the refrigerating means, means responsive to refrigeration demand for controlling operation of the fluid motor, said motor and control means being located entirely on the load section, two separable conduits forming the sole connection between the portions of the power transmission located on each section and means located entirely on the power plant section for controlling the pump displacement to maintain the delivery thereof substantially constant independent of power plant speed.

5. In a multi-sectioned vehicle having a power plant section and a load section and refrigerating means on the load section, a hydraulic power transmission for driving the refrigerating means from the power plant and comprising a pump driven by the power plant, a fluid motor driving the refrigerating means, means responsive to refrigeration demand for controlling operation of the fluid motor, said means including a bypass valve for the fluid motor normally biased to closed position, a pilot valve responsive to the degree of refrigeration produced by the refrigerating means for removing the bias from the bypass valve to cause opening thereof under the action of fluid delivered by the pump, and a closed circuit connecting the pump and fluid motor.

FERRIS T. HARRINGTON.

REFERENCES CITED

The following references are of record in the file of this patent:

UNITED STATES PATENTS

| Number | Name | Date |
|---|---|---|
| 1,880,245 | Fourness | Oct. 4, 1932 |
| 2,056,896 | Douglas | Oct. 6, 1936 |
| 2,077,974 | Wishart | Apr. 20, 1937 |
| 2,097,857 | Ferris et al. | Nov. 2, 1937 |
| 2,101,495 | Ferris et al. | Dec. 7, 1937 |
| 2,212,503 | Nickell | Aug. 27, 1940 |
| 2,340,292 | Aspelin et al. | Feb. 1, 1944 |